United States Patent [19]
DeMasters et al.

[11] Patent Number: 5,518,036
[45] Date of Patent: May 21, 1996

[54] MULTI-LAYER PLASTIC PIPE AND METHOD AND APPARATUS FOR EXTRUSION THEREOF

[75] Inventors: Jimmie G. DeMasters, Wylie, Tex.; Leonard A. Fears, Bixby, Okla.

[73] Assignee: Phillips Petroleum Company, Bartlesville, Okla.

[21] Appl. No.: 315,276

[22] Filed: Sep. 29, 1994

[51] Int. Cl.$^6$ .............................. E03B 7/00; B29C 47/06; B29C 47/20

[52] U.S. Cl. .................... 138/141; 264/1.9; 264/171.28; 264/209.4; 264/209.8; 425/131.1; 425/462; 425/467

[58] Field of Search ................ 264/173, 209.1, 264/323, 209.4, 209.8, 173.12, 171.28, 171.27, 1.9, 1.6, 173.14; 425/133.1, 131.1, 462, 467; 138/125, 140–141, 118.1, 118

[56] References Cited

U.S. PATENT DOCUMENTS

| | | | |
|---|---|---|---|
| 3,102,303 | 9/1963 | Lainson | 425/378.1 |
| 3,860,372 | 1/1975 | Newman, Jr. | 425/133.1 |
| 3,993,421 | 11/1976 | Adair | 425/380 |
| 4,061,461 | 12/1977 | Hessenthaler | 264/173 |
| 4,125,585 | 11/1978 | Rosenbaum | 264/173 |
| 4,134,952 | 1/1979 | Yoshikawa et al. | 264/173 |
| 4,144,011 | 3/1979 | Sponaugle | 425/192 |
| 4,173,446 | 11/1979 | Larsen | 425/380 |
| 4,208,175 | 6/1980 | Rosenbaum | 425/131.1 |
| 4,249,875 | 2/1981 | Hart et al. | 425/133.1 |
| 4,265,693 | 5/1981 | Nishimoto et al. | 156/218 |
| 4,305,703 | 12/1981 | Lupke et al. | 425/72 |
| 4,344,907 | 8/1982 | Herrington | 264/173 |
| 4,402,658 | 9/1983 | Larsen | 425/192 R |
| 4,402,898 | 9/1983 | Rosenbaum | 264/173 |
| 4,465,449 | 8/1984 | Hornbeck | 425/131.1 |
| 4,499,041 | 2/1985 | Hahn et al. | 264/209.8 |
| 4,507,071 | 3/1985 | Hahn et al. | 264/209.8 |
| 4,640,313 | 2/1987 | Stanley | 138/141 |
| 4,657,497 | 4/1987 | Dehennau et al. | 425/133.1 |
| 4,708,615 | 11/1987 | Bethea et al. | 425/131.1 |
| 4,718,770 | 1/1988 | Christy | 366/71 |
| 4,933,134 | 6/1990 | Järvenkylä et al. | 264/508 |
| 5,104,595 | 4/1992 | Hunter | 264/33 |

FOREIGN PATENT DOCUMENTS

| | | | |
|---|---|---|---|
| 3044535 | 6/1982 | Germany | 264/173 |
| 47-26664 | 7/1972 | Japan | 425/133.1 |
| 57-57737 | 4/1982 | Japan | 264/209.1 |

*Primary Examiner*—Jeffery R. Thurlow
*Attorney, Agent, or Firm*—Ryan N. Cross

[57] ABSTRACT

A method and apparatus for extruding a multi-layer plastic pipe are provided wherein a second liquified plastic is injected into and through a prow and, subsequently, into a radial flow conduit of a die assembly in which a first liquified plastic flows through the radial flow conduit. Subsequently, the first and second liquified plastic are introduced into and through an annular flow conduit and a third liquified plastic is injected into the annular flow conduit of the die assembly. Wherein within the die assembly the first liquified plastic forms a first layer, the second liquified plastic forms a second layer inside the first layer and the third liquified plastic forms a third layer outside the first layer. Additionally, a multi-layered plastic pipe which can be produced by the inventive die assembly is provided. The multi-layered plastic pipe has an ultraviolet light-protective outer layer and a light-reflecting inner layer.

13 Claims, 3 Drawing Sheets

5,518,036

MULTI-LAYER PLASTIC PIPE AND METHOD AND APPARATUS FOR EXTRUSION THEREOF

BACKGROUND OF THE INVENTION

This invention relates to the extrusion of a multi-layer plastic pipe. In one aspect, this invention relates to the extrusion of pipe having an ultraviolet light-protective outer surface and a light-reflecting inner surface. In another aspect, this invention relates to a method and apparatus for the extrusion of a multi-layer pipe.

In the maintenance of large diameter plastic pipes, (e.g., generally up to about 48 inches in diameter) such as water lines and sewer drainage piping or the like, it is in many cases required that a utility surface inspection thereof include video viewing and/or recording of the interior of the pipe. Traditionally, such pipes have been made utilizing a black, high density polyethylene (HDPE) because of the black HDPE pipe's excellent resistance to deterioration due to ultraviolet light. However, the black interior of the black HDPE pipe makes it unsuitable for video inspection of the interior due to the light absorption properties of the black color.

SUMMARY OF THE INVENTION

It is, therefore, an object of the present invention to provide a pipe which has an interior suitable for video inspection and yet is resistant to deterioration caused by ultraviolet light.

It is a further object of the present invention to provide a method and apparatus for producing such a pipe.

More particularly, it is an object of the present invention to provide a method and apparatus for producing a multi-layer plastic pipe.

The above objects are realized in a pipe comprising an outer plastic layer and an inner plastic layer wherein the outer plastic layer is an ultraviolet light-protective color and the inner plastic is a light-reflecting color.

According to one aspect of the invention, there is provided a die assembly suitable for producing a multi-layered plastic pipe. The die assembly has a radial flow conduit through which a first liquified plastic flows for distribution into an annular flow conduit, and a split prow through which a second liquified plastic can enter into the radial flow conduits such that the second liquified plastic is carried downstream by the movement of the first liquified plastic and forms a plastic layer on the inside surface of the plastic layer formed by the first liquified plastic.

According to yet another aspect of the invention, there is provided a die assembly for producing multi-layered plastic pipe wherein a plastic pipe is formed by distributing a first liquified plastic through a radial flow conduit into an annular flow conduit to form a pipe wherein the die assembly is provided with a plurality of injection ports spaced around the circumference of the annular flow passage such that a second liquified plastic is introduced through the injection ports and distributed around the outside of the first liquified plastic to form a bi-layer pipe having an outside layer comprised of the second liquified plastic and an inside layer comprised of the first liquified plastic.

DETAILED DESCRIPTION OF THE INVENTION

Figure 1:
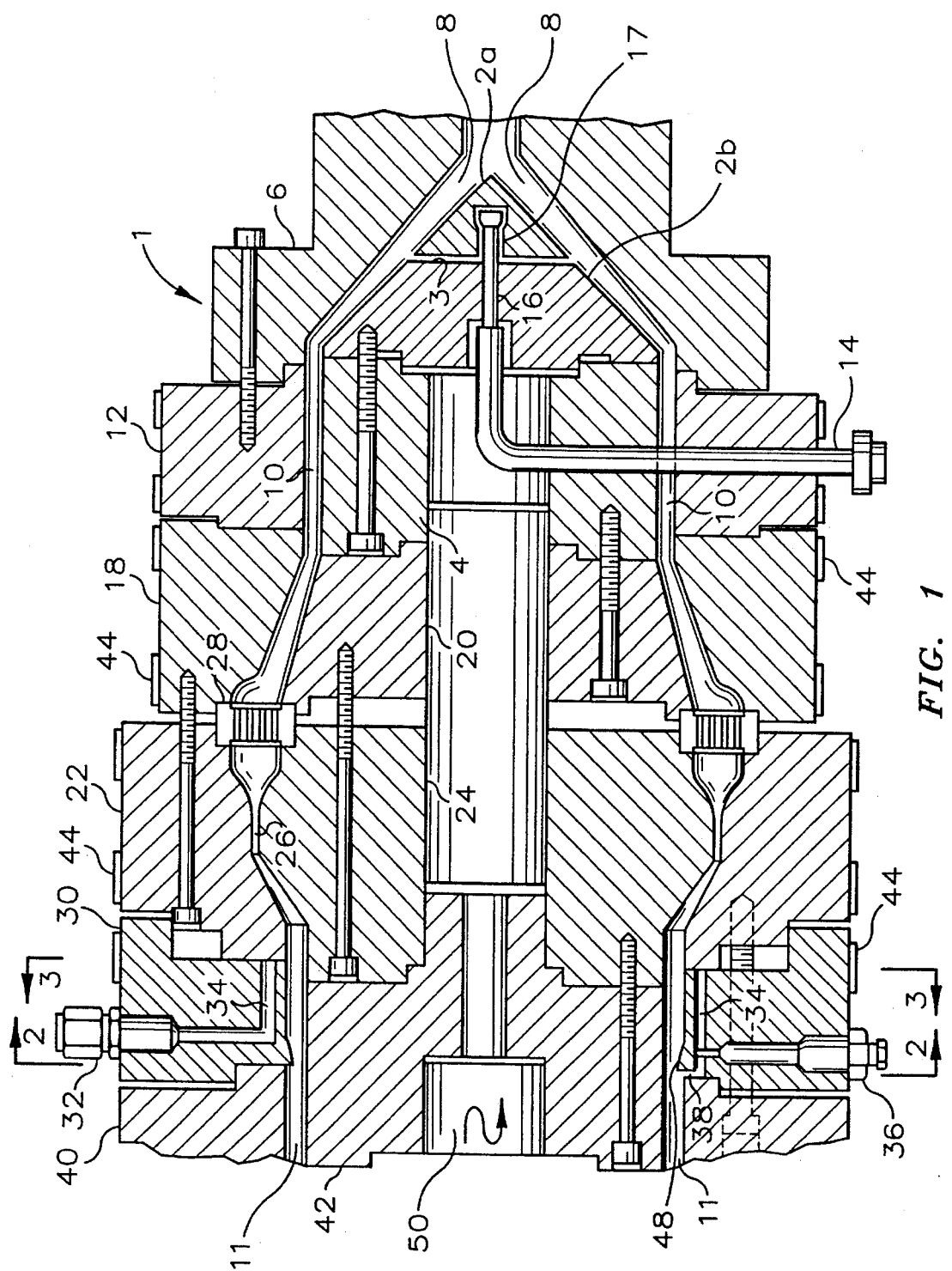
FIG. 1 of the drawings is a side view, partially in section, of a pipe forming extrusion die assembly according to the present invention.

Referring now to the drawings, FIG. 1 shows an extrusion die 1 according to the invention, including a conventional injection or upstream end (not illustrated). In this Figure, the prow 2, comprised of nose piece 2a and base piece 2b which form flow passage 3, is mounted to inner ring 4 and, together with the distribution plate 6 forms radial flow conduit 8. As used herein, radial flow conduit 8 is an annular passage angling outward from the center of extrusion die 1. Radial flow conduit 8 contains webs (not illustrated), or spokes, extending from prow 2 to distribution plate 6. Generally, these webs will have a diamond shape with the flow of liquified plastic impinging upon a corner of the diamond; however, the webs can have any suitable shape. Thus, these webs divide radial flow conduit 8 into a series of radial passages. Additionally, the webs aid in supporting the prow. Downstream and attached to distribution plate 6 is outer ring 12, which together with inner ring 4 forms flow conduit 10, which is in fluid flow communication with radial flow conduit 8. Flow conduit 10 is generally an annular conduit containing webs extending from inner ring 4 to outer ring 12, similar to the webs in radial flow conduit 8.

Injection conduit 14 extends through outer ring 12 and inner ring 4 and extends into prow 2a. Preferably, injection conduit 14 will extend through the center of a web contained within flow conduit 10. Injection conduit 14 terminates in distributor 16 such that molten plastic can be released from the end of distributor 16. Molten plastic released from the end of distributor 16 flows back along the outside of distributor 16 in passage 17 and enters into flow passage 3.

Downstream from outer ring 12 is outer plenum ring 18. Mounted within and cooperating with outer plenum ring 18 is inner plenum ring 20. Outer plenum ring 18 and inner plenum ring 20 form an extension of flow conduit 10. Downstream from outer plenum ring 18 is outer restrictor ring 22. Mounted within and cooperating with outer restrictor ring 22 is inner restrictor ring 24. Outer restrictor ring 22 and inner restrictor ring 24 together form an annular necked down opening or choke 26 in fluid flow communication with flow conduit 10. Inner and outer plenum rings 18 and 20 and inner and outer restrictor rings 22 and 24 hold therebetween breaker plate or screen 28 through which the liquified plastic flows from flow conduit 10 to choke 26. Breaker plate 28 has a multiplicity of holes extending therethrough. The liquified plastic flowing from flow conduit 10 to choke 26 passes through these holes.

Downstream from and in fluid flow communication with choke 26 is annular flow conduit 11. Annular flow conduit 11 is formed by the outer rings downstream from breaker plate 28; outer restricted ring 22, injection ring 30, and bushing 40, and by the inner rings downstream from breaker plate 28; inner restrictor ring 26 and mandrel 42. Unlike flow conduit 10 and radial flow conduit 8, annular flow conduit 11 does not contain any webs. Annular flow conduit 11 is the basic pipe-forming portion of the die.

Figure 2:
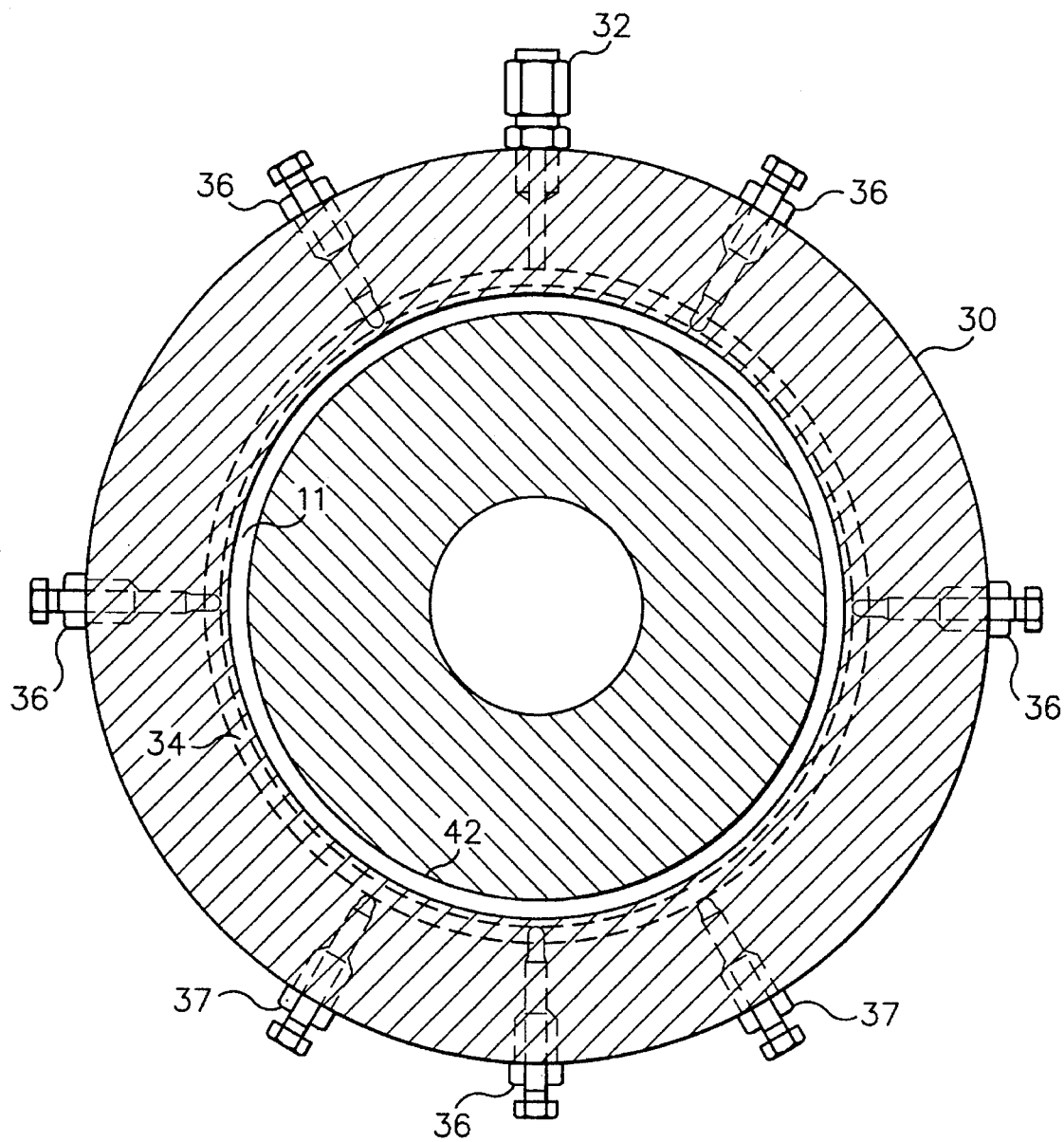
FIG. 2 is a view taken along line 2—2 of FIG. 1 illustrating flow regulators useful in a die assembly according to the present invention.
Figure 3:
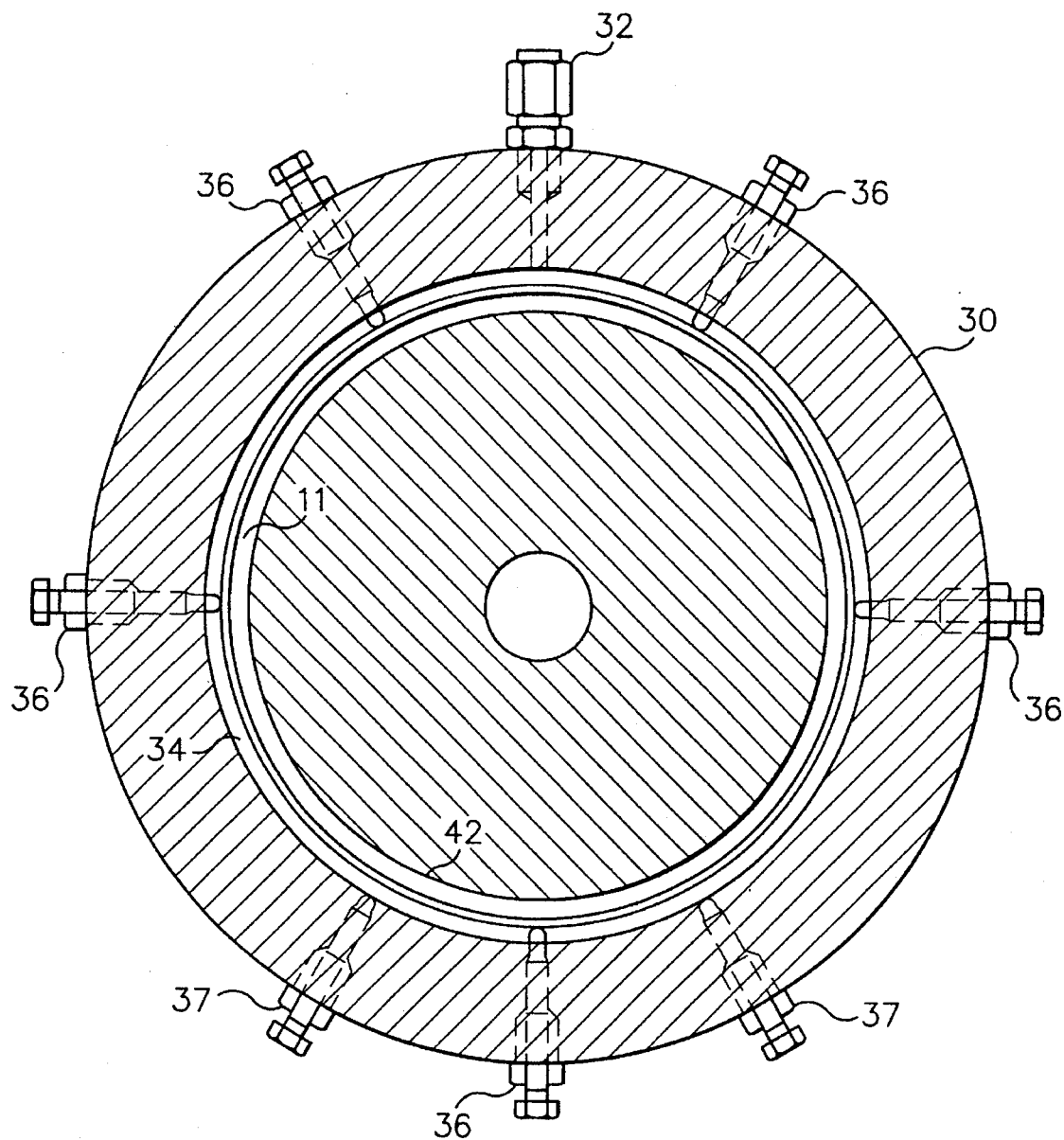
FIG. 3 is a view taken along line 3—3 of FIG. 1 illustrating flow regulators useful in a die assembly according to the present invention.

Downstream from outer restrictor ring 22 is injection ring 30. Injection nozzle 32 extends into injection ring 30 and is in fluid flow communication with annular flow path 34. Annular flow path 34 is concentric to annular flow conduit 11. Spaced about annular flow path 34 are flow regulators 36 and 37, which can better be seen in FIG. 2 and FIG. 3. Flow regulators 36 and 37 can be adjusted to control the flow of liquified plastic from annular flow path 34 into injection port 38 which is in fluid flow communication with annular flow path 34 and annular flow conduit 11. Any suitable flow regulator can be used in this invention as flow regulators 36 and 37. The flow regulators illustrated can be screwed inward to close off each port 38 from plastic flow, see flow regulators 36, or can be screwed outward to open up each port 38 to flow from annular flow path 34, see flow regulator 37. Injection ports 38 are located adjacent to and downstream of protruding lip 48.

Downstream from injection ring 30 is bushing 40. Bushing 40 is attached to injection ring 30. Mounted within bushing 40 and attached to inner restrictor ring 26 is mandrel 42. Bushing 40, together with the mandrel 42, forms an annular extension of annular flow conduit 11.

Extrusion die 1 is heated along its length by means of band heaters 44 or the like, as needed. The band heaters 44 are positioned along the die as needed to maintain the plastic in a liquid state. Additional heat is provided by internal heater 50 which is positioned within the mandrel 42.

In the use of extrusion die 1, an extrusion assembly is coupled to the distribution plate 6 and a first liquified plastic is forced under pressure, in a range of from about 1500 psi to about 7500 psi depending on the diameter of the pipe being produced and the particular plastic used, into the radial flow conduit 8 so that the flow of molten polymer is evenly distributed from the extruder exit to radiate from a central core to the outer circumference of the pipe to be extruded. The extruder can be chosen from either dynamic or screw extruders. The flow passages on the distribution plate can be chosen from spoke wheel pattern, spider web pattern, or any of the usual channel-type flow patterns used in distributing plastic to the outer circumference of the extruded pipe.

A second extruded liquified plastic is forced under pressure, in a range of from about 5000 psi to about 6500 psi depending on the diameter of the pipe being produced and the particular plastic used, into injection conduit 14 which is in fluid flow communication with flow passage 3. The second liquified plastic enters passage 17 through distributor 16. The second liquified plastic within passage 17 flows back along distributor 16 and enters flow passage 3 such that the flow of molten polymer is evenly distributed throughout flow passage 3. From flow passage 3 the plastic enters radial flow conduit 8 where it is carried downstream by the movement of the first liquified plastic such that the two plastics form an inner layer consisting of the second liquified plastic and an outer layer consisting of the first liquified plastic.

The two layers of liquified plastic then flow downstream through breaker plate or screen 28. Breaker plate 28 acts to eliminate any seams formed by the flowing of the liquified plastic around the webs. Liquified plastic from breaker plate 28 flows through the choke 26 and thence into annular flow conduit 11.

Downstream from choke 26 a third extruded liquified plastic is injected into annular conduit 11. The third liquified plastic is forced under pressure, in a range of about 5000 psi to about 6500 psig depending on the diameter of the pipe being produced and the particular plastic used, into injection nozzle 32. Injection nozzle 32 is in fluid flow communication with annular flow path 34 which is in turn in fluid flow communication with injection ports 38. Thus, the third liquified plastic enters injection nozzle 32 is distributed about annular flow path 34. From annular flow path 34 the plastic enters injection ports 38 and, subsequently, enters annular conduit 11. Flow regulators 36 and 37 can be adjusted to insure an even distribution of the third liquified plastic about the outer surface of the first liquified plastic. Flow regulators 36 are shown closed and, thus, prevent plastic from entering the associated injection ports 38. Flow regulators 37 are shown open, and, thus, allow plastic to enter the associated injection ports 38. Additionally, flow regulators 36 and 37 can be adjusted to allow a partial flow of plastic. Thus, downstream from injection ports 38, the die produces a tri-layer pipe with the center layer consisting of the first liquified plastic, the inner-most layer consisting of the second liquified plastic and the outer-most layer consisting of the third liquified plastic.

Downstream from the injection ports 38 the formed pipe is allowed to cool into a solidified but pliant pipe. Cooling is completed as the formed pipe passes inside a sizing sleeve, which is provided with an appropriate cooling jacket. The completely solidified pipe, as it leaves the sizing sleeve, is drawn from the die at a speed greater than the speed of travel of the plastic through annular conduit 11 and the sizing sleeve. Because of this drawing or stretching of the pipe, which occurs while the pipe is still pliable, the annular conduit 11 has a width or die opening larger than the ultimate minimum thickness of the finished pipe. The draw ratio to be utilized is determined by experience and depends upon the plastic to be utilized in the formation of the pipe, the size of the pipe to be formed and the pull or draw which is necessary to reduce the thickness of the pipe from the width of the annular conduit 11 or die opening to the ultimate thickness of the finished pipe. Usually the draw ratio is about 1.5 for pipes less than about six inches in diameter and ranges down to about 1.25 for larger diameter pipes.

Utilizing the die as described above the resulting pipe is tri-layer, as previously described; however, by utilizing only either the injection conduit 14 or the injection nozzle 32, the resulting pipe will be a bi-layer pipe. Finally, if neither the injection conduit 14 nor the injection nozzle 32 is used then there will only be a single layer pipe consisting of the first liquified plastic. Generally, the layer formed from the first liquified plastic will be thicker than those formed by either the second or third liquified plastic.

Although the above described die assembly uses both an injection of a second liquified plastic through the prow and a third liquified plastic at the annular flow conduit, it is within the scope of the invention to utilize only one of the two secondary injection methods. Thus, it is within the scope of the invention to utilize a die assembly that has only an injection of the second liquidized plastic through the prow and not the injection of the third liquidized plastic or to utilize a die assembly that has only the injection of the third liquidized plastic at the annular flow conduit and not the injection of the second liquified plastic through the prow.

In a preferred embodiment the die assembly is used to produce a plastic pipe having an outer-most layer that is an ultraviolet light-protective color and an inner-most plastic layer that is a light-reflecting color. By ultraviolet light-protective color it is meant that the plastic layer is of a color and composition sufficient to prevent or retard the deterioration of the plastic layer upon exposure to ultraviolet light. Particularly preferred is a black plastic layer because of its excellent UV protection. By light-reflecting color it is meant that the color is light enough to provide adequate reflection of light to allow accurate visual or video inspection of the inside of the pipe. It has been found that the addition of titanium dioxide to the liquid plastic of the inner layer can be used to provide a usable light-reflecting color.

While any suitable plastic or combination of plastics can be used in the die assembly and can be used to produce the preferred pipe described above, it is presently preferred to use polyethylene as the plastic for the various layers. More preferably, the plastic will be those plastics known as high density polyethylene (HDPE). In a particularly preferred embodiment the resulting pipe will have an outer layer comprising black high density polyethylene and an inner layer comprised of high density polyethylene and titanium dioxide ($TO_2$). While the titanium dioxide can be added in any suitable amount that will increase the reflectiveness for viewing, it is presently preferred that the titanium dioxide be present in an amount of about 0.25 to about 0.50 weight-% based on the total weight of the plastic composition. Although the addition of titanium oxide will insure a sufficiently reflective color for viewing, it has been found that the resulting white surface creates a glare. Thus, in an even more preferred embodiment, a small amount of carbon black, preferably less than about 0.25 weight-%, is added to the plastic composition in order to create a light gray color. The resulting HDPE/$TO_2$/carbon black composition has a sufficiently light-reflecting color to allow viewing but reduces the amount of glare so that the reflective light does not interfere with viewing.

While specific structures have been set forth herein, it is to be understood that variations, equivalences and modifications thereof will be apparent to one skilled in the art and the invention is to be limited only in accordance with the claims.

That which is claimed:

1. A die assembly for forming a plastic pipe from a first liquified plastic received from a first extruder, a second liquified plastic received from a second extruder and a third liquified plastic received from a third extruder, said die assembly comprising:

a distributing plate;

a split prow which together with said distributing plate forms a radial flow conduit which receives said first liquified plastic from said first extruder, said split prow having a nose piece and a base piece wherein said nose piece and said base piece form a flow passage in fluid flow communication with said radial flow conduit;

an injection conduit for receiving said second liquified plastic from said second extruder and introducing said second liquified plastic to said flow passage such that said second liquified plastic flows through said flow passage and is introduced into said radial flow conduit such that said second liquified plastic is carried downstream by the movement of said first liquified plastic within said radial flow conduit;

at least one inner ring and at least one outer ring which together form an annular flow conduit which is in fluid flow communication with said radial flow conduit such that said first and said second liquified plastic are distributed about said annular flow conduit with said first liquified plastic distributed in a first layer and said second liquified plastic distributed in a second layer such that said second layer is inside said first layer;

a plurality of injection ports spaced around the circumference of said annular flow conduit, said injection ports being in fluid flow communication with said third extruder such that said third liquified plastic is introduced from said third extruder to said annular flow conduit through said injection ports and is carried downstream of said injection ports by the movement of said first and said second liquified plastic through said annular flow conduit such that said third liquified plastic forms a third layer outside said first layer;

an annular channel concentric with and having a greater radius than said annular flow conduit wherein said annular channel is in fluid flow communication with said third extruder and said injection ports such that said annular channel receives said third liquified plastic from said third extruder and introduces said third liquified plastic to said injection ports; and flow regulating means associated with said injection ports such that the amount of said third liquified plastic delivered to said annular flow conduit through each injection port can be controlled by adjustment of said flow regulating means.

2. A die assembly according to claim 1 further comprising distributor means located at the end of said injection conduit for evenly distributing said second liquified plastic throughout said flow passage such that said first liquified plastic forms an outer plastic layer and said second liquified plastic forms an inner plastic layer.

3. A die assembly for forming a plastic pipe from a first liquified plastic received from a first extruder, a second liquified plastic received from a second extruder and a third liquified plastic received from a third extruder, said die assembly comprising:

a distributing plate;

a split prow which together with said distributing plate forms a radial flow conduit which receives said first liquified plastic from said first extruder, said split prow having a nose piece and a base piece wherein said nose piece and said base piece form a flow passage in fluid flow communication with said radial flow conduit;

an injection conduit for receiving said second liquified plastic from said second extruder and introducing said second liquified plastic to said flow passage such that said second liquified plastic flows through said flow passage and is introduced into said radial flow conduit such that said second liquified plastic is carried downstream by the movement of said first liquified plastic within said radial flow conduit;

distributor means located at the end of said injection conduit for evenly distributing said second liquified plastic throughout said flow passage such that said first liquified plastic forms an outer plastic layer and said second liquified plastic forms an inner plastic layer;

at least one inner ring and at least one outer ring which together form an annular flow conduit which is in fluid flow communication with said radial flow conduit such that said first and said second liquified plastic are distributed about said annular flow conduit with said first liquified plastic distributed in a first layer and said second liquified plastic distributed in a second layer such that said second layer is inside said first layer;

an annular channel concentric with and having a greater radius than said annular flow conduit wherein said annular channel is in fluid flow communication with said third extruder such that said annular channel receives said third liquified plastic from said third extruder;

a plurality of injection ports spaced around the circumference of said annular flow conduit, said injection ports being in fluid flow communication with said annular channel such that said third liquified plastic is introduced from said annular channel to said annular flow conduit through said injection ports and is carried downstream of said injection ports by the movement of said first and said second liquified plastic through said annular flow conduit such that said third liquified plastic forms a third layer outside said first layer; and flow regulating means associated with said injection ports such that the amount of said third liquified plastic delivered to said annular flow conduit through each injection port can be controlled by adjustment of said flow regulating means.

4. A process for the extrusion of a pipe comprising:
(a) introducing a first liquified plastic material comprising polyethylene into a die having a radial flow conduit, an annular flow conduit in fluid flow communication with said radial flow conduit and a prow having a flow passage in fluid flow communication with said radial flow conduit wherein said first liquified plastic material is introduced into said die such that said first liquified plastic enters said radial flow conduit and is evenly dispersed into said annular flow conduit such that within said annular flow conduit a substantially cylindrical pipe is formed; and
(b) introducing a second liquified plastic comprising polyethylene, titanium dioxide and carbon black into said flow passage such that said second liquified plastic flows into said radial flow conduit so that said second liquified plastic is carried downstream by the flow of said first liquified plastic through said radial flow conduit and wherein said second liquified plastic flows into said radial flow conduit in such a manner as to create an inner layer of second liquified plastic and an outer layer of said first liquified plastic so that within said annular flow conduit a bi-layer pipe is formed.

5. A process according to claim 4 wherein said first liquified plastic is an ultraviolet light-protective color and said second liquified plastic is a light-reflecting color.

6. A process according to claim 5 wherein said second liquified plastic is comprised of about 0.25 to about 0.50 weight percent titanium dioxide based on the total composition of said second liquified plastic.

7. A process according to claim 4 further comprising introducing a third liquified plastic into said annular flow conduits through a series of ports located around the circumference of said annular flow conduit such that a tri-layer pipe is formed with said third liquified plastic forming a layer outside the layer formed by said first liquified plastic.

8. A process for the extrusion of a pipe comprising:
(a) introducing a first liquified plastic material comprising polyethylene, titanium dioxide and carbon black into a die having a radial flow conduit and an annular flow conduit such that said first liquified plastic enters said radial flow conduit and is dispersed from said radial flow conduits into said annular flow conduit such that within said annular flow conduit a substantially cylindrical pipe is formed; and
(b) introducing a second liquified plastic comprising polyethylene into said annular flow conduit through a plurality of ports located around the circumference of said annular flow conduit such that a bi-layer pipe is formed with said second liquified plastic forming a layer outside the layer formed by said first liquified plastic.

9. A process according to claim 8 wherein said first liquified plastic is a light-reflecting color and said second liquified plastic is an ultraviolet light-protective color.

10. A process according to claim 9 wherein said first liquified plastic is comprised of about 0.25 to about 0.50 weight percent titanium dioxide based on the total composition of said first liquified plastic.

11. A pipe comprising an outer plastic layer and an inner plastic layer wherein said outer plastic layer is an ultraviolet light-protective color and said inner plastic layer is a light-reflecting color and wherein said inner plastic layer is comprised of polyethylene, about 0.25 to about 0.50 weight percent titanium dioxide based on the total composition of said inner plastic layer and less than 0.25 weight percent carbon black and wherein said carbon black and said titanium dioxide are present in quantities such that the inner plastic layer has a sufficiently light-reflecting color to allow viewing but reduces the amount of glare so that the reflective light does not interfere with viewing.

12. A pipe according to claim 11 wherein said outer plastic layer is black in color and said inner plastic layer is light gray in color.

13. A die assembly according to claim 2 wherein said flow regulating means comprises a plurality of flow regulators each associated with one of said injection ports such that said flow regulators regulate flow of said third liquified plastic through said injection ports.

* * * * *